(12) United States Patent
Kushnick

(10) Patent No.: US 9,093,827 B2
(45) Date of Patent: Jul. 28, 2015

(54) WIRE PULLING DEVICE

(71) Applicant: William B. Kushnick, Oak Ridge, NJ (US)

(72) Inventor: William B. Kushnick, Oak Ridge, NJ (US)

(*) Notice: Subject to any disclaimer, the term of this patent is extended or adjusted under 35 U.S.C. 154(b) by 94 days.

(21) Appl. No.: 14/053,663

(22) Filed: Oct. 15, 2013

(65) Prior Publication Data

US 2014/0110449 A1    Apr. 24, 2014

Related U.S. Application Data

(60) Provisional application No. 61/717,670, filed on Oct. 24, 2012.

(51) Int. Cl.
| H02G 1/00 | (2006.01) |
|---|---|
| H02G 1/02 | (2006.01) |
| H02G 1/04 | (2006.01) |
| H02G 1/08 | (2006.01) |

(52) U.S. Cl.
CPC . *H02G 1/00* (2013.01); *H02G 1/02* (2013.01); *H02G 1/04* (2013.01); *H02G 1/085* (2013.01)

(58) Field of Classification Search
CPC ............ H02G 1/04; H02G 1/08; H02G 1/085
See application file for complete search history.

(56) References Cited

U.S. PATENT DOCUMENTS

| 427,302 | A | | 5/1890 | Dumas | |
|---|---|---|---|---|---|
| 427,482 | A | | 5/1890 | Ruck | |
| 702,704 | A | * | 6/1902 | Carll | 248/59 |
| 1,331,569 | A | | 2/1920 | Knapp | |
| 1,479,155 | A | | 1/1924 | Peirce, Jr. | |
| 1,539,801 | A | | 5/1925 | Davidson | |
| 1,575,017 | A | | 3/1926 | Swars | |
| 1,840,216 | A | * | 1/1932 | Tormo | 248/72 |
| 2,161,782 | A | * | 6/1939 | Flower | 248/59 |
| 2,947,504 | A | | 8/1960 | Ruhlman | |
| 2,999,661 | A | | 9/1961 | Shuter | |
| 3,089,387 | A | | 5/1963 | Damm | |
| 3,220,677 | A | | 11/1965 | Sweeney | |
| 3,260,487 | A | | 7/1966 | Schlein | |
| 3,572,623 | A | * | 3/1971 | Lapp | 248/72 |
| 3,945,502 | A | | 3/1976 | Diener | |
| 5,702,077 | A | * | 12/1997 | Heath | 248/59 |
| 5,924,655 | A | | 7/1999 | Rinderer | |
| 7,014,230 | B1 | | 3/2006 | Hung | |
| 7,284,728 | B2 | | 10/2007 | Connolly | |
| 7,520,476 | B2 | * | 4/2009 | Caveney et al. | 248/72 |
| 2004/0056156 | A1 | * | 3/2004 | Dodson | 248/59 |

FOREIGN PATENT DOCUMENTS

| GB | 836656 A | 6/1958 |
|---|---|---|
| GB | 805333 A | 12/1958 |
| WO | WO2011/0948408 A1 | 8/2011 |

* cited by examiner

*Primary Examiner* — Lee D Wilson
*Assistant Examiner* — Tyrone V Hall, Jr.
(74) *Attorney, Agent, or Firm* — Gearhart Law, LLC

(57) ABSTRACT

The current disclosure describes and teaches a wire pulling device having a base member. A vertical post and a horizontal post are attached to the base member, serving as anchoring posts for a clevis that may be opened and closed. The device may be attached to installation sites for wires and cables. Using an attachment mechanism, the base member may be affixed to a joist, a rafter, or an angle iron. Wires or cables may be threaded or disposed into the clevis and suspended to the installation sites. An installer may pull the wire or cable to proper positions before permanent affixations such as wire ties may be applied. The current device and its associated method facilitate the wire installation process.

20 Claims, 11 Drawing Sheets

WIRE PULLING DEVICE

CLAIM OF PRIORITY

This application claims priority of the U.S. provisional application No. 61/717,670 which was filed on Oct. 24, 2012 and the contents of which is incorporated herein by reference.

FIELD OF THE INVENTION

The current invention relates to a wire pulling device. In particular, the current invention relates to a device that helps to suspend wires and/or cables so that such wires and/or cables may be pulled to and installed in the proper location.

BACKGROUND OF THE INVENTION

With the development of technology, more and more wires and cables are used to transfer various kinds of signals, information, and energy. Fiber optic cables, TV cables, telephone lines, electricity wire, and all kinds of other wires and cables have become an indispensible part of most people's lives. However, it is desirable to install these cables and wires in places hidden from plain sight and everyday access. In a neatly arranged modern residence or business, very little cables and/or wires may be seen. The bulk of the cables and wires are installed above the ceiling and behind walls. Such arrangements take into consideration both aesthetic appeals and utilitarian needs. It is messy and dangerous to leave the cables and wires exposed in the open.

However, it is never an easy task to pull a wire or cable in the joist space below the roof or behind the walls. No matter if it is in the stage of initial installation or remodeling, it is hard to ensure that the cables and wires are attached to the proper places. And besides, it is almost always labor-intensive and time consuming to pull the wires and cables through various obstacles and under the roof. Wire ties or wire wraps are generally irreversible attachments and cannot assist the pulling of wires. It is thus difficult to use wire ties and it is undesirable to affix the cables or wires before the best location is chosen.

The current invention provides a simple and elegant solution to the problems in a wire installation process. With proper usage, the current invention helps a worker to pull the wires and cables and install them in well-chosen locations much faster and with much less labor. No other device serves the same function as the wire pulling device disclosed here. Some devices only bear a modest resemblance in terms of structure.

DESCRIPTION OF RELATED ART

U.S. Pat. No. 7,014,230 discloses an improved structure hoist-use base hoisting ring comprising of a U-shaped clevis movably suspended from the two sides at the lower end of a cylindrical base mount as well as a circular top mounting bushing at the upper section and a bottom mounting bushing at the center section having an upwardly projecting neck and a passageway that are situated over the top and bottom lateral surfaces of a bore through the interior portion of the cylindrical base mount, enabling the installation of a bolt into the top mounting bushing center section and downward through the bottom mounting bushing and the fastening and positioning of its threaded section into the threaded hole of a weight at the lower end. Among the features of the present invention, an annular recess is disposed along the top surface and center section of the cylindrical base mount that provides for the nesting of a flat planar bearing. The center portion opening of the planar bearing is sleeved over the periphery of the neck of the bottom mounting bushing such that its top surface is against the circular top mounting bushing bottom side, enabling the lifting of the load of the weight at the bottom end of the hoisting ring. Since the planar bearing so postured has active rotating capability, the hoisting ring lifting the weight has convenient operation that is adjustable and freely rotatable.

The '230 patent, however, does not serve the same function as the current invention. In addition, its structure and design are fundamentally different from the current invention. Moreover, the teachings of the '230 patent fail to address the issues solved by the invention described herein. Two embodiments of this invention are illustrated in the accompanying drawings and will be described in more detail herein below.

SUMMARY OF THE INVENTION

The current invention discloses a wire pulling device, comprising: a base member having a front side and an inner side; a vertical post attached to the front side of the base member; a horizontal post attached to the front side of the base member; an anchoring clevis attached to either the vertical post or the horizontal post; an attachment mechanism disposed on the base member, wherein the anchoring clevis encloses an openable wire pulling interspace capable of suspending wires and cables, and the attachment mechanism is capable of attaching the wire pulling device to a flat piece.

As used in the current invention, it should be clear that the wire pulling device may be used to facilitate the installation of any kind of wires, cables, ducts, tubing, and insulates, including all types of elongated and flexible structures that may need to be affixed, directly or indirectly, to a building or accessory structures of a building. The current device may be used to install wires and cables in all settings and locations such as but not limited to in the joist space beneath the roof and within the walls.

The base member is attached to the structure at the installation site. The method of attachment may vary depending on the specific design of the attachment mechanism. The base member is preferably a flat plank that is small and portable. The attachment is preferred to be removable—detachment will not cause physical damage to the structures that are combined. The vertical post and horizontal post are two protruding structures onto which the clevis may be affixed. These posts provide alternatives so that the user may choose where to connect the clevis depending on the settings and locations of the installation and availability of anchoring structures, such as but not limited to joists and angle irons.

The clevis structure, as a general design, is known in the arts. The current invention, however, preferably adopts a clevis having a connecting end and a pair of branching prongs. There may be a closing rod attached to the branching prongs with a removable pin, wherein the closing rod and branching prongs embrace an interspace through which the wires and/or cables may be positioned and suspended. The user may thread the wire and/or cable through the interspace before pulling. On the alternative, the user may remove the pin and closing rod to open the clevis, put the wire or cable in the interspace, and re-close the clevis by inserting the closing rod and pin. Then the user may pull the wires to proper locations and to a proper length. In certain installations, more than one current device may be needed.

The wire pulling device is preferably made from strong and durable material. It is also desirable that the materials are not very expensive. The various components of the device may be made from the same or different materials, such as but not limited to: metal such as iron, steel, and aluminum alloy, glass or fiberglass, and hard plastic such as but not limited to PVC, or any combinations thereof.

In general, the present invention succeeds in conferring the following, and others not mentioned, desirable and useful benefits and objectives.

It is an object of the present invention to provide a wire pulling device that may assist a user's efforts to install wires and cables.

It is an object of the present invention to provide a wire pulling device that may be easily attached to joists and angle irons.

It is an object of the present invention to provide a wire pulling device that may suit different installation settings and locations.

It is an object of the present invention to provide a wire pulling device that is light and portable.

It is another object of the current invention to provide a wire pulling device that allows the adjustment of wire positions.

It is still another object of the current invention to provide a wire pulling device that is made from strong and durable materials.

It is another object of the current invention to provide a wire pulling device that is inexpensive It is yet another object of the current invention to provide a wire pulling device that is easy to attach and detach.

It is another object of the current invention to provide a wire pulling device that uses different attachment mechanisms.

DESCRIPTION OF THE PREFERRED EMBODIMENTS

Figure 1:
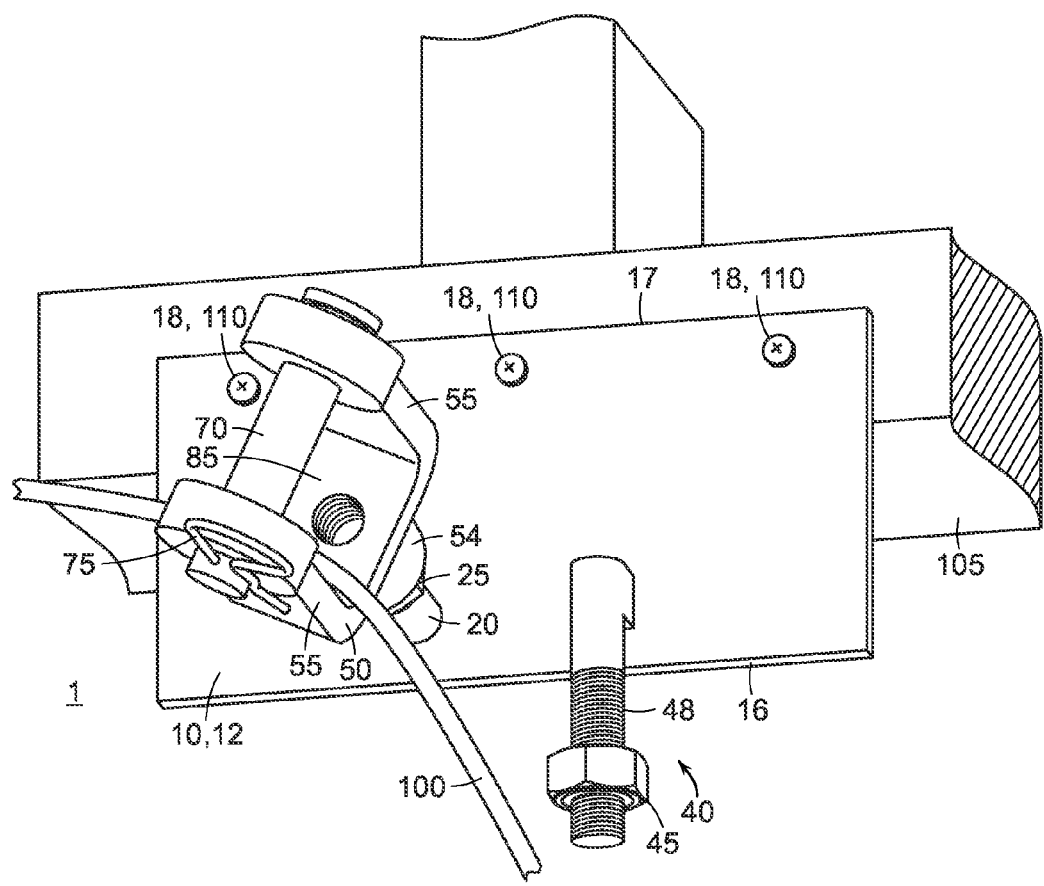
FIG. 1 is a perspective view of a first embodiment of the wire pulling device when it is in use.

The preferred embodiments of the present invention will now be described with reference to the drawings. Identical elements in the various figures are identified, as far as possible, with the same reference numerals. Reference will now be made in detail to embodiments of the present invention. Such embodiments are provided by way of explanation of the present invention, which is not intended to be limited thereto. In fact, those of ordinary skill in the art may appreciate upon reading the present specification and viewing the present drawings that various modifications and variations can be made thereto without deviating from the innovative concepts of the invention.

FIG. 1 is a perspective view of a first embodiment of the wire pulling device when it is in use. Shown in FIG. 1 is the wire pulling device 1 having a base member 10 with a front side 12, a post edge 16, and an attachment edge 17. Also shown in FIG. 1 are a vertical post 20 having a vertical post nut 25, a horizontal post 40 having a horizontal post nut 45 and a horizontal threaded section 48, and a clevis 50 attached to the vertical post 20. In addition, the base member 10 is attached to the joist 105 by screws 110 through screw holes 18 located close to the attachment edge 17 of the base member 10. The clevis 50 comprises a connecting end 54, branching prongs 55, a closing rod 70, and a fastening pin 75, wherein the fastening pin 75 affixes the closing rod 70 to the branching prongs 55, and the branching prong 55 and the closing rod 70 embraces a wire pulling interspace 85. A wire 100 is positioned within the interspace 85.

Figure 2A:
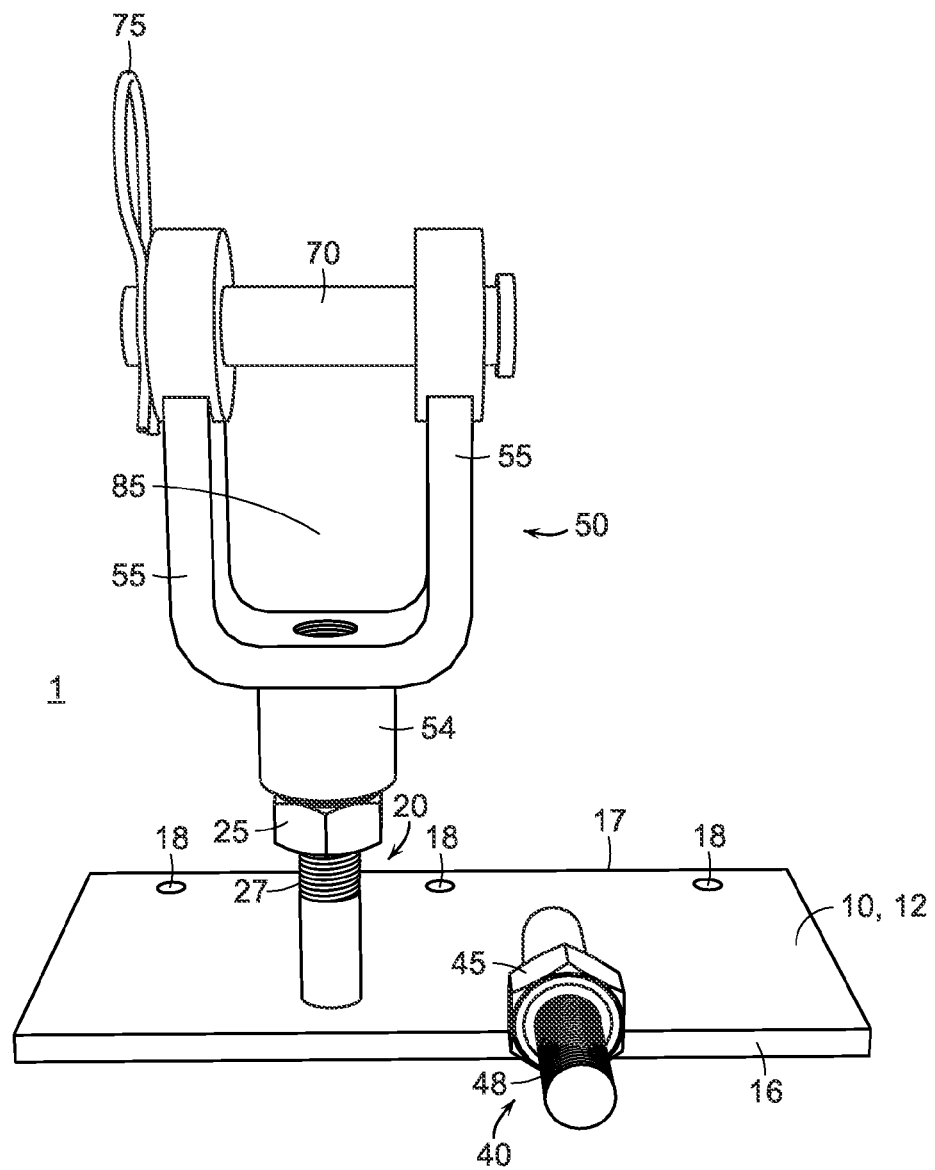
FIG. 2A is a front view of the first embodiment of the wire pulling device.

FIG. 2A is a front view of the first embodiment of the wire pulling device. Shown in FIG. 2A is the wire pulling device 1 having a base member 10 with a front side 12, a post edge 16, and an attachment edge 17. Also shown in FIG. 2A are a vertical post 20 having a vertical post nut 25 and a vertical threaded section 27, a horizontal post 40 having a horizontal post nut 45 and a horizontal threaded section 48, and a clevis 50 attached to the vertical threaded section 27 of the vertical post 20. In addition, there are screw holes 18 located close to the attachment edge 17 of the base member 10. The clevis 50 comprises a connecting end 54, branching prongs 55, a closing rod 70, and a fastening pin 75, wherein the fastening pin 75 affixes the closing rod 70 to the branching prongs 55, and the branching prong 55 and the closing rod 70 embrace a wire pulling interspace 85.

Figure 2B:
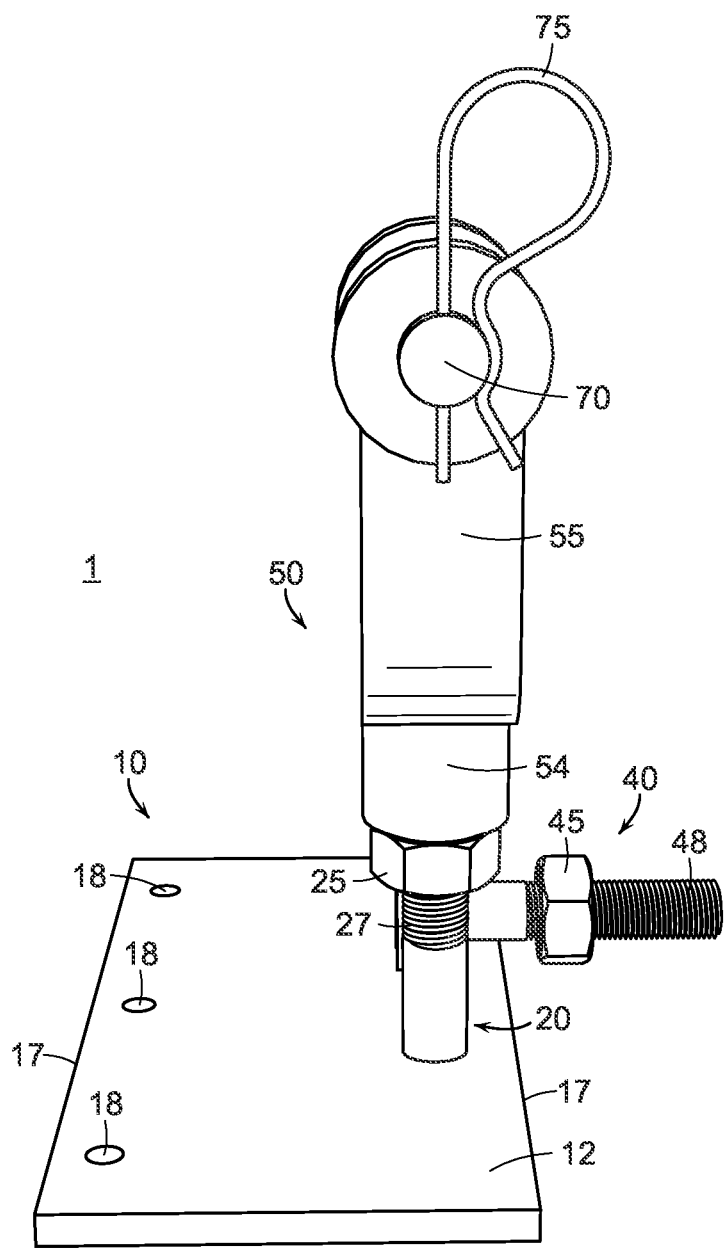
FIG. 2B is a first side view of the first embodiment of the wire pulling device.

FIG. 2B is a first side view of the first embodiment of the wire pulling device. Shown in FIG. 2B is the wire pulling device 1 having a base member 10 with a front side 12, a post edge 16, and an attachment edge 17. Also shown in FIG. 2B are a vertical post 20 having a vertical post nut 25 and a vertical threaded section 27, a horizontal post 40 having a horizontal post nut 45 and a horizontal threaded section 48, and a clevis 50 attached to the vertical threaded section 27 of the vertical post 20. In addition, there are screw holes 18 located close to the attachment edge 17 of the base member 10. The clevis 50 comprises a connecting end 54, branching prongs 55, a closing rod 70, and a fastening pin 75.

Figure 2C:
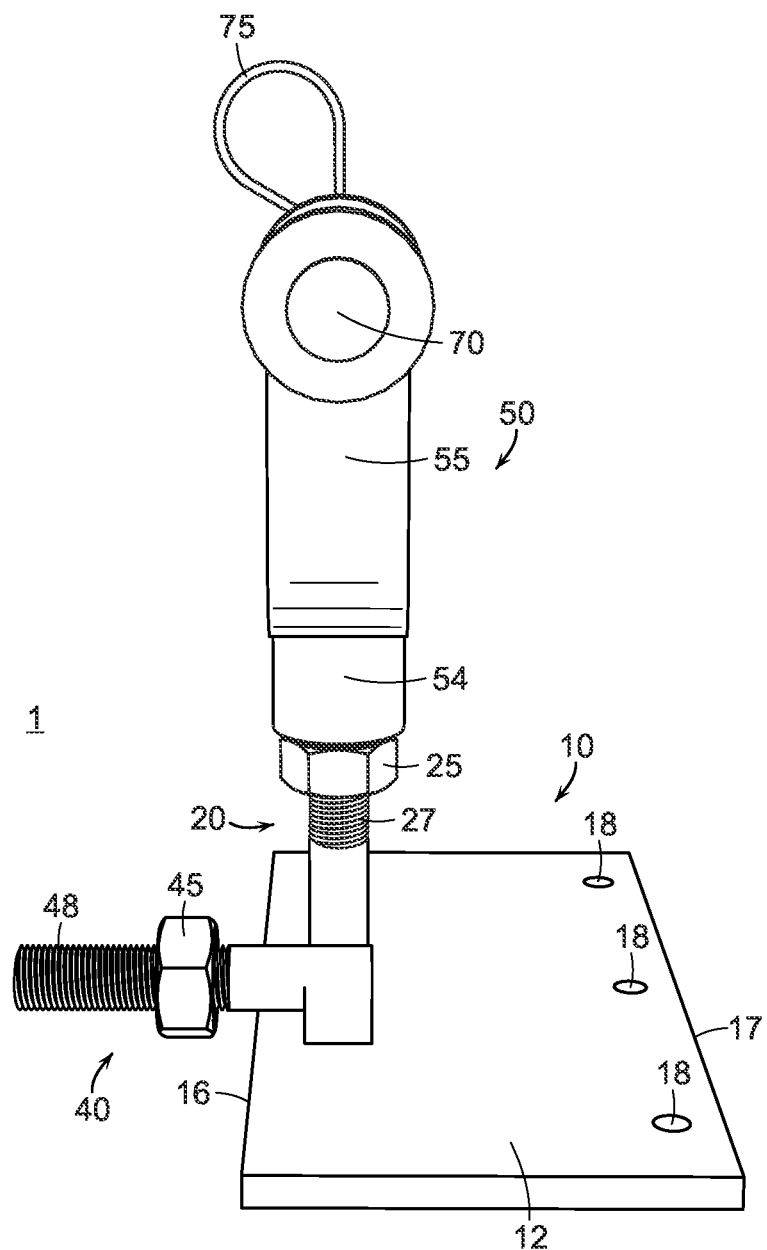
FIG. 2C is a second side view of the first embodiment of the wire pulling device.

FIG. 2C is a second side view of the first embodiment of the wire pulling device. Shown in FIG. 2C is the wire pulling device 1 having a base member 10 with a front side 12, a post edge 16, and an attachment edge 17. Also shown in FIG. 2C are a vertical post 20 having a vertical post nut 25 and a vertical threaded section 27, a horizontal post 40 having a horizontal post nut 45 and a horizontal threaded section 48, and a clevis 50 attached to the vertical threaded section 27 of the vertical post 20. In addition, there are screw holes 18 located close to the attachment edge 17 of the base member 10. The clevis 50 comprises a connecting end 54, branching prongs 55, a closing rod 70, and a fastening pin 75.

Figure 3:
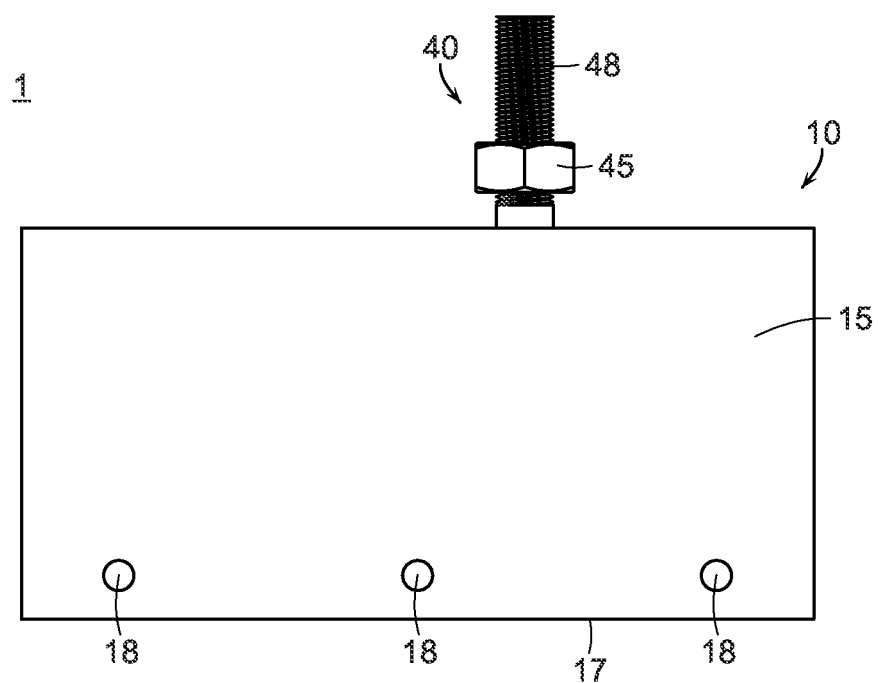
FIG. 3 is a bottom view of the first embodiment of the wire pulling device.

FIG. 3 is a bottom view of the first embodiment of the wire pulling device. Shown in FIG. 3 is the wire pulling device 1 having a base member 10 with a back side 15. Also shown in FIG. 3 is the horizontal post 40 having a horizontal post nut 45 and a horizontal threaded section 48. In addition, there are screw holes 18 located close to the attachment edge 17 of the base member 10.

Referring to FIGS. 1, 2A-C, and 3, the base member 10 is preferred to be a flat plank having a generally rectangular shape. Other shapes may also be used to accommodate different needs and manufacturing preferences. For the rectangular base member 10, two opposite edges may be termed the attachment edge 17 and the post edge 16. The base member 10 serves as the anchoring plate for the other components. It is attached to a structures at the installing site, generally above the ceiling and beneath the roof. One example, as shown in FIG. 1, is when the base member 10 is attached to a joist beneath the roof.

The vertical post 20 and the horizontal post 40 may each be used separately for the attachment of the clevis 50. Preferably, while the vertical post 20 is generally perpendicular to the base member 10; the horizontal post 40 is generally parallel to the base member 10. In addition, it is preferred that the vertical post 20 and the horizontal post 40 are located close to the post edge 16. The threaded sections, including the vertical threaded section 27 and the horizontal threaded section 48, are used to connect to the clevis 50. Preferably, the horizontal threaded section 48 protrudes out of the post edge 16, as shown in FIG. 3. The vertical post 20 and horizontal post 40 may be attached to the base member 10 with any method. For example, the posts may be welded to the front side 12 of the base member.

Referring again to FIGS. 1, 2A-C, and 3, the screw holes 18 may be considered an attachment mechanism. As shown in FIG. 1, screws 110 may be used to attach the base member 10 to a joist 105. Preferably the attachment mechanism is located close to the attachment edge 17. It should be noted that the attachment mechanism may take other forms, as shown in the second embodiment. When the base member 10 is being attached to a wooden structure, such as a joist, it is preferred that the attachment mechanism is screw holes.

The clevis 50 is the structure actually suspending the wire and/or cable. The clevis 50 has a connecting end 55 that may be threaded onto the vertical threaded section 27 or the horizontal threaded section 48. The vertical post nut 25 and the horizontal post nut 45 are used to adjust the position and angle of the clevis 50. By precisely positioning the vertical post nut 25 and horizontal post nut 45, the distance of the clevis 50 the front side 12 of the base member may be altered. Moreover, changing the positions of the nuts may also help to adjust the twisting angle of the clevis 50. For example, while the hypothetical plane of the branching prongs is perpendicular to the horizontal post 40 in FIGS. 2A-C, this plane is abut 45 degrees to the horizontal post 40 in FIG. 1. It should also be noted that the wire pulling device may include two devises so that one clevis may be attached to the vertical post 20 and the other to the horizontal post 40. Such a design may also more flexibility in terms of choosing how to pull the wires.

During a wire attaching process, the wire is first suspended and pulled using the wire pull device herein introduced. Then the wire is permanently attached using a wire tie or wire wrap. In particular, an installer may first removably attach a wire pulling device 1 having a base member 10 to a joist or an angle iron beneath the roof, with the base member 10 secured against the joist or angle iron. Then the installer may attach the clevis 50 of the wire pulling device 1 to the base member 10, either to the vertical post 20 or the horizontal post 40 on the base member, depending where the base member 10 is attached and the relative positioning of the base member 10 and the direction whereto the wire is being pulled. After opening the clevis 50, the installer may position the wire in an interspace 85 of the clevis 50, close the clevis 50, allow the wire to be suspended by the clevis, and pull the wire to an appropriate position. Finally, the installer may open the clevis, attach the wire with a wire tie or wire wrap to a permanent position, and remove the base member from the installing site. Multiple wire pulling devices may be used in an installation for proper positioning of the wires. In addition, the wire may also be threaded through the insterspace 85 without opening the clevis 50. Moreover, the wire may be permanently attached before the clevis 50 is opened again.

Figure 4:
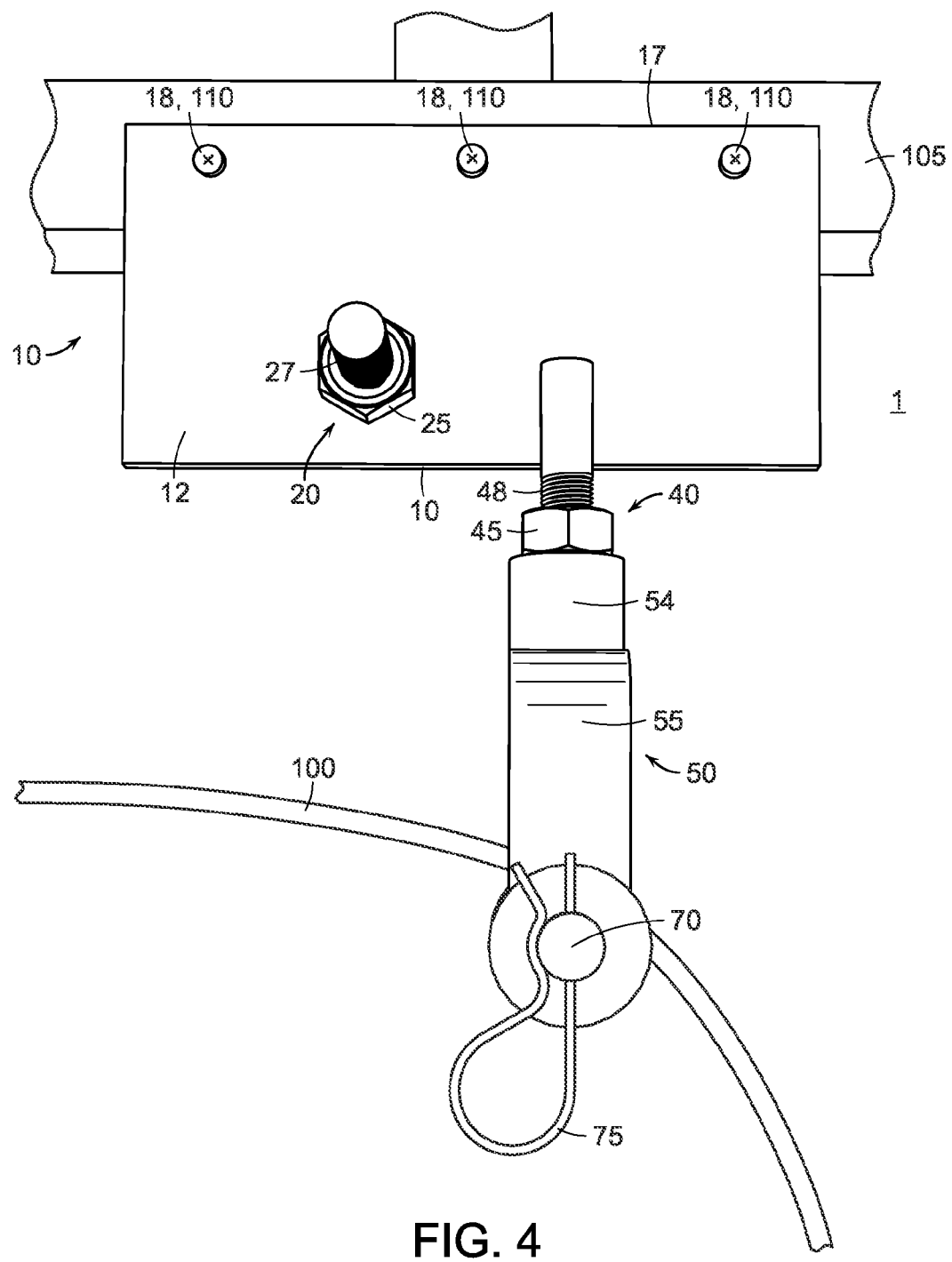
FIG. 4 is a top view of the first embodiment of the wire pulling device when it is in use.

FIG. 4 is a top view of the first embodiment of the wire pulling device when it is in use, with the clevis 50 attached to the horizontal post 40. Shown in FIG. 4 is the wire pulling device 1 having a base member 10 with a front side 12, a post edge 16, and an attachment edge 17. Also shown in FIG. 4 are a vertical post 20 having a vertical post nut 25 and a vertical threaded section 27, a horizontal post 40 having a horizontal post nut 45 and a horizontal threaded section 48, and a clevis 50 attached to the horizontal threaded section 48 of the horizontal post 40. In addition, the base member 10 is attached to a joist 105 by screws 110 through screw holes 18 located close to the attachment edge 17 of the base member 10. The clevis 50 comprises a connecting end 54, branching prongs 55, a closing rod 70, and a fastening pin 75. A wire 100 is suspended by the clevis 50.

FIG. 4 serves to show the device in use when the clevis 50 is attached to the horizontal post 40, instead of the vertical post 20. Where to attach the clevis 50 is decided by the location of the anchoring structure, such as the position of the joist and the angle iron. In addition, the vertical post nut 25 and the horizontal post nut 45 may be used to adjust the position of the clevis 50 and the angle of the clevis 50 when it is attached to the posts. Preferably, the vertical post nut 25 and the horizontal post nut 45 are held flush against the attachment end 54 of the clevis 50, determining how much the clevis 50 goes down on the threaded sections of the posts. By precise adjustment of the nuts, the angle of the clevis 50, especially the branching prongs, may be adjusted.

Figure 5A:
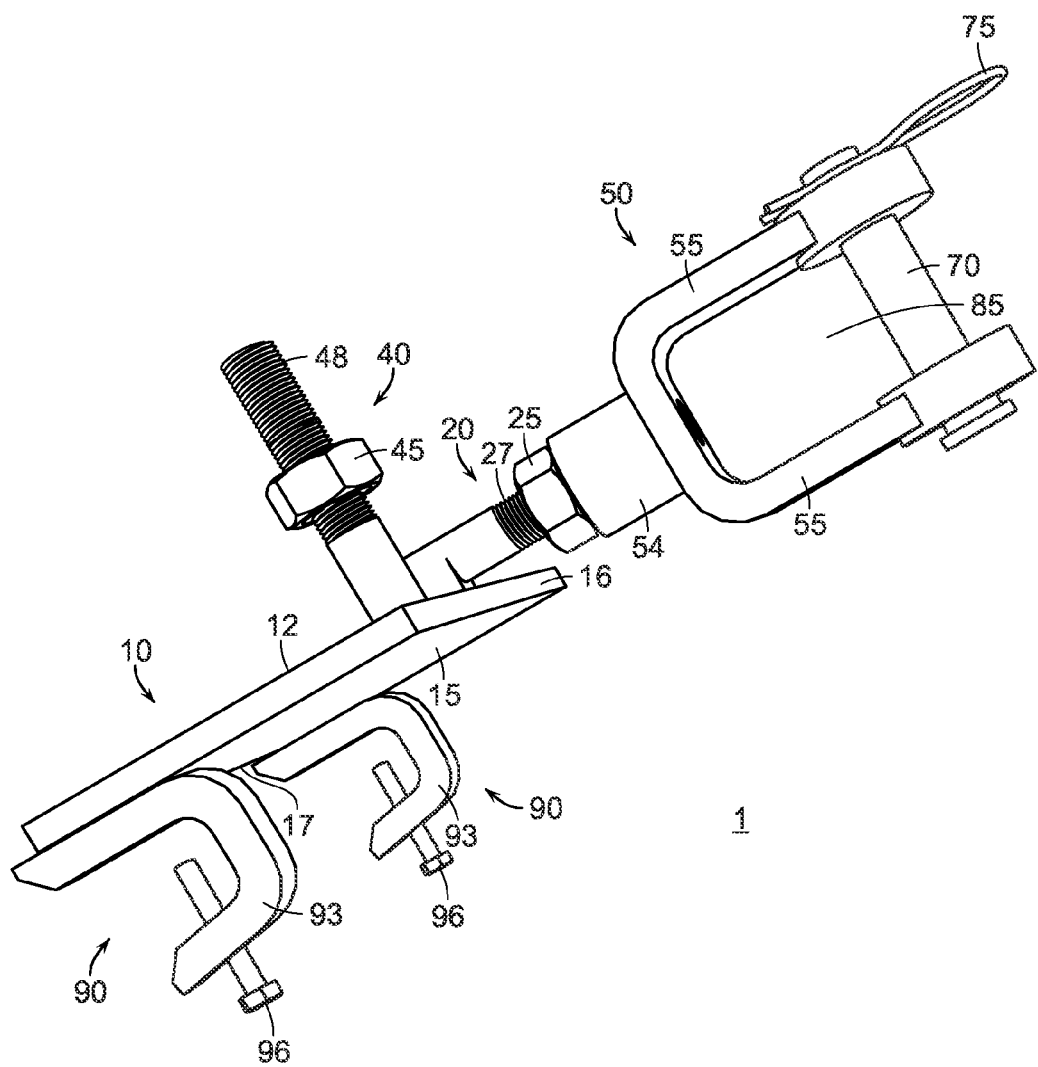
FIG. 5A is a first side view of the second embodiment of the wire pulling device.

FIG. 5A is a first side view of the second embodiment of the wire pulling device. FIG. 5A shows the wire pulling device 1 having a base member 10 with a front side 12, a back side 15, a post edge 16, and an attachment edge 17. Also shown in FIG. 5A are a vertical post 20 having a vertical post nut 25 and a vertical threaded section 27, a horizontal post 40 having a horizontal post nut 45 and a horizontal threaded section 48, and a clevis 50 attached to the horizontal threaded section 48 of the horizontal post 40. The attachment mechanism in the second embodiment is a pair of attachment clamps 90 located at the back side 15 and close to the attachment edge 17 of the base member 10. Each attachment clamps 90 comprises an overarching member 93 and a clamping screw 96. The clevis 50 comprises a connecting end 54, branching prongs 55, a closing rod 70, and a fastening pin 75, wherein the fastening pin 75 affixes the closing rod 70 to the branching prongs 55, and the branching prong 55 and the closing rod 70 embraces a wire pulling interspace 85.

Figure 5B:
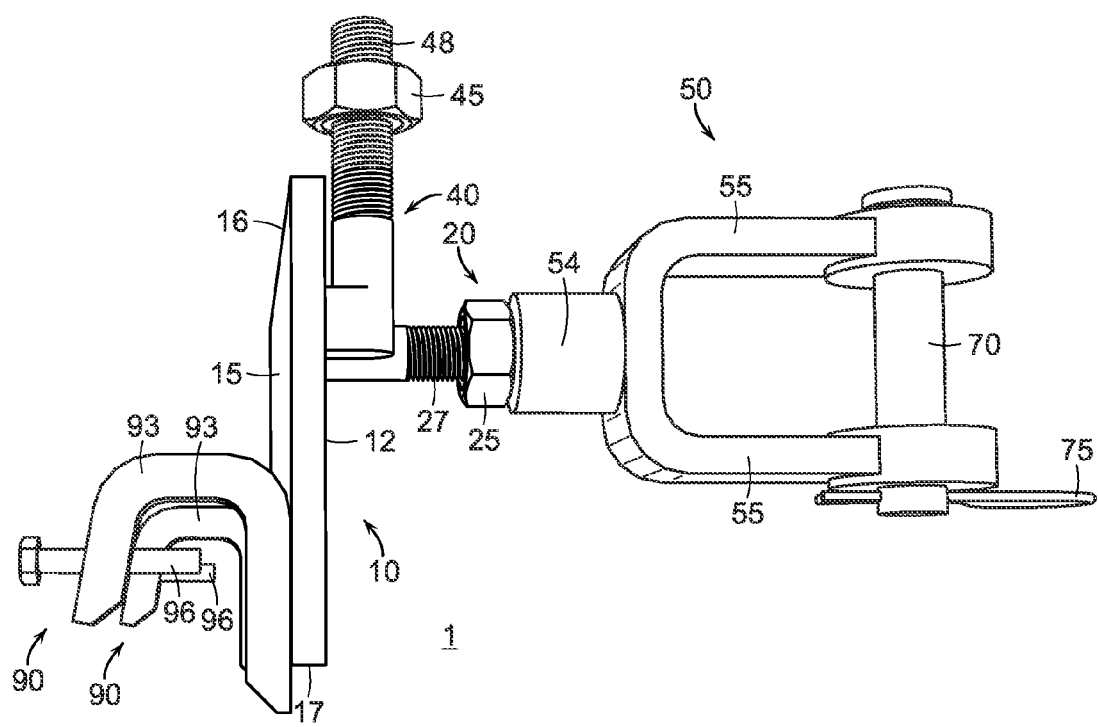
FIG. 5B is a second side view of the second embodiment of the wire pulling device.

FIG. 5B is a second side view of the second embodiment of the wire pulling device. FIG. 5B shows the wire pulling device 1 having a base member 10 with a front side 12, a back side 15, a post edge 16, and an attachment edge 17. Also shown in FIG. 5B are a vertical post 20 having a vertical post nut 25 and a vertical threaded section 27, a horizontal post 40 having a horizontal post nut 45 and a horizontal threaded section 48, and a clevis 50 attached to the vertical threaded section 27 of the vertical post 20. The attachment mechanism in the second embodiment is a pair of attachment clamps 90 located at the back surface 15 and close to the attachment edge 17 of the base member 10. Each attachment clamps 90 comprises an overarching member 93 and a clamping screw 96. The clevis 50 comprises a connecting end 54, branching prongs 55, a closing rod 70, and a fastening pin 75, wherein the fastening pin 75 affixes the closing rod 70 to the branching prongs, and the branching prong 55 and the closing rod embraces a wire pulling interspace 85.

Figure 6A:
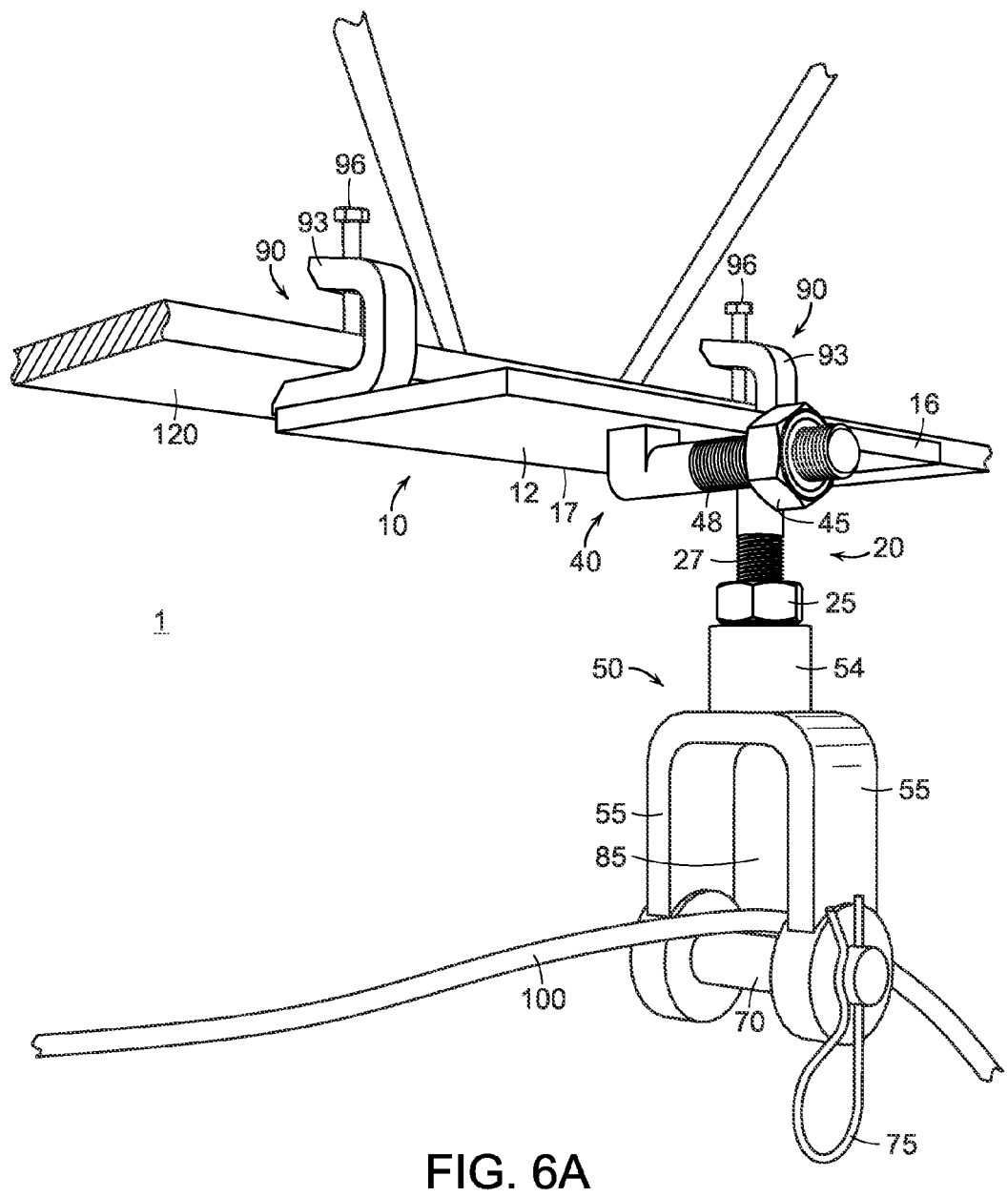
FIG. 6A is a first perspective view of the second embodiment of the wire pulling device when it is in use.

FIG. 6A is a first perspective view of the second embodiment of the wire pulling device with it is in use. Essentially the same elements are shown in FIG. 6A as FIG. 5A. The clevis 50 is attached to the vertical post 20. The base member 10 is attached to an angle iron 120, wherein the attachment clamps 90 clamp the edge of the angle iron 120.

Figure 6B:
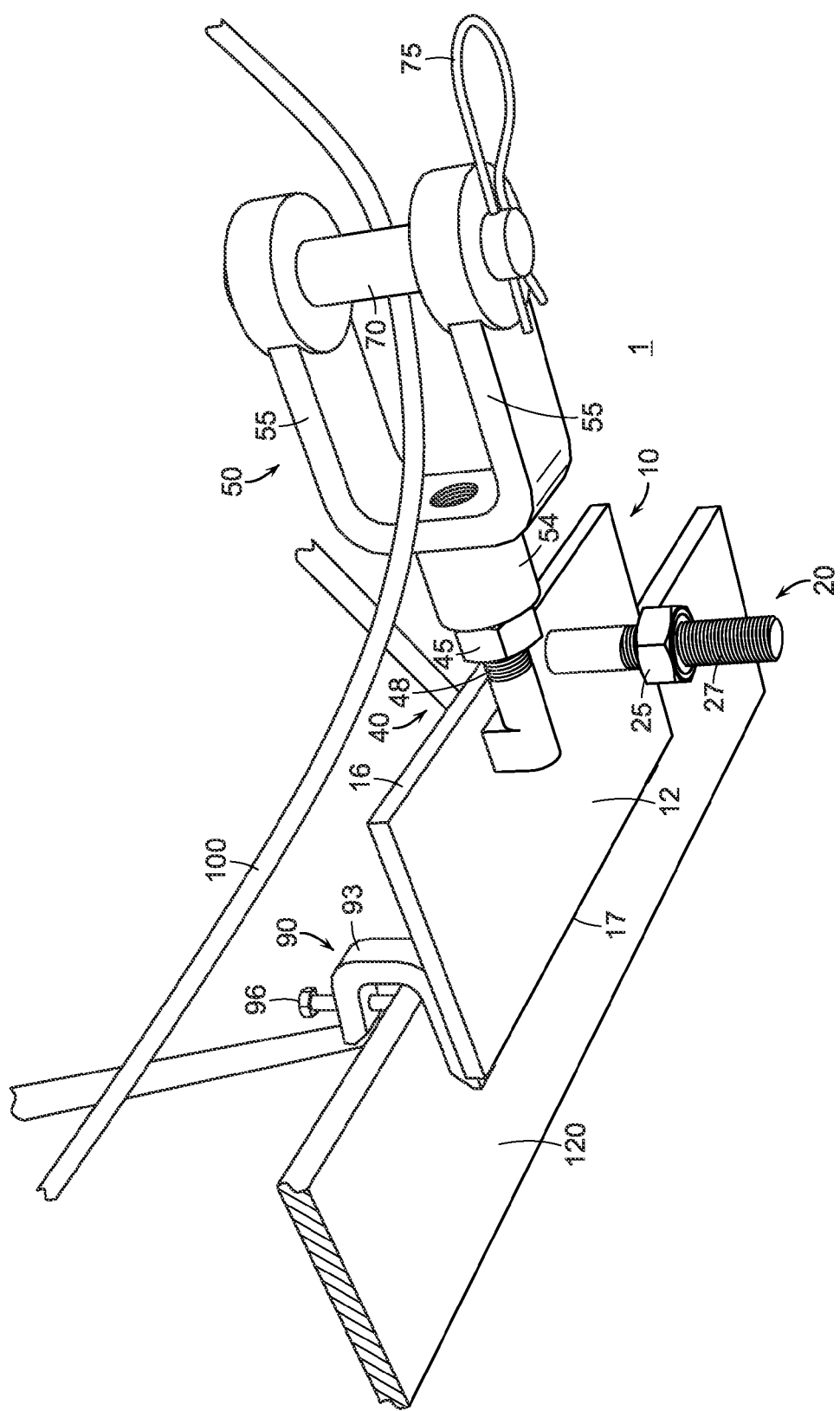
FIG. 6B is a second perspective view of the second embodiment of the wire pulling device when it is in use.

FIG. 6B is a second perspective view of the second embodiment of the wire pulling device when it is in use. Essentially the same elements are shown in FIG. 6B as FIG. 5B. The clevis 50 is attached to the horizontal post 40. The base member 10 is attached to an angle iron 120, wherein the attachment clamps 90 clamp the edge of the angle iron 120.

The second embodiment uses a different attachment mechanism from the first embodiment. As indicated above, it is preferred that the screw holes 18 and screws are used to attachment of the base member 10 to wooden structure. However, if the base member 10 is to be attached to structures having a high hardness, such as an angle iron, the clamping mechanism shown in the second embodiment is preferred.

Figure 7:
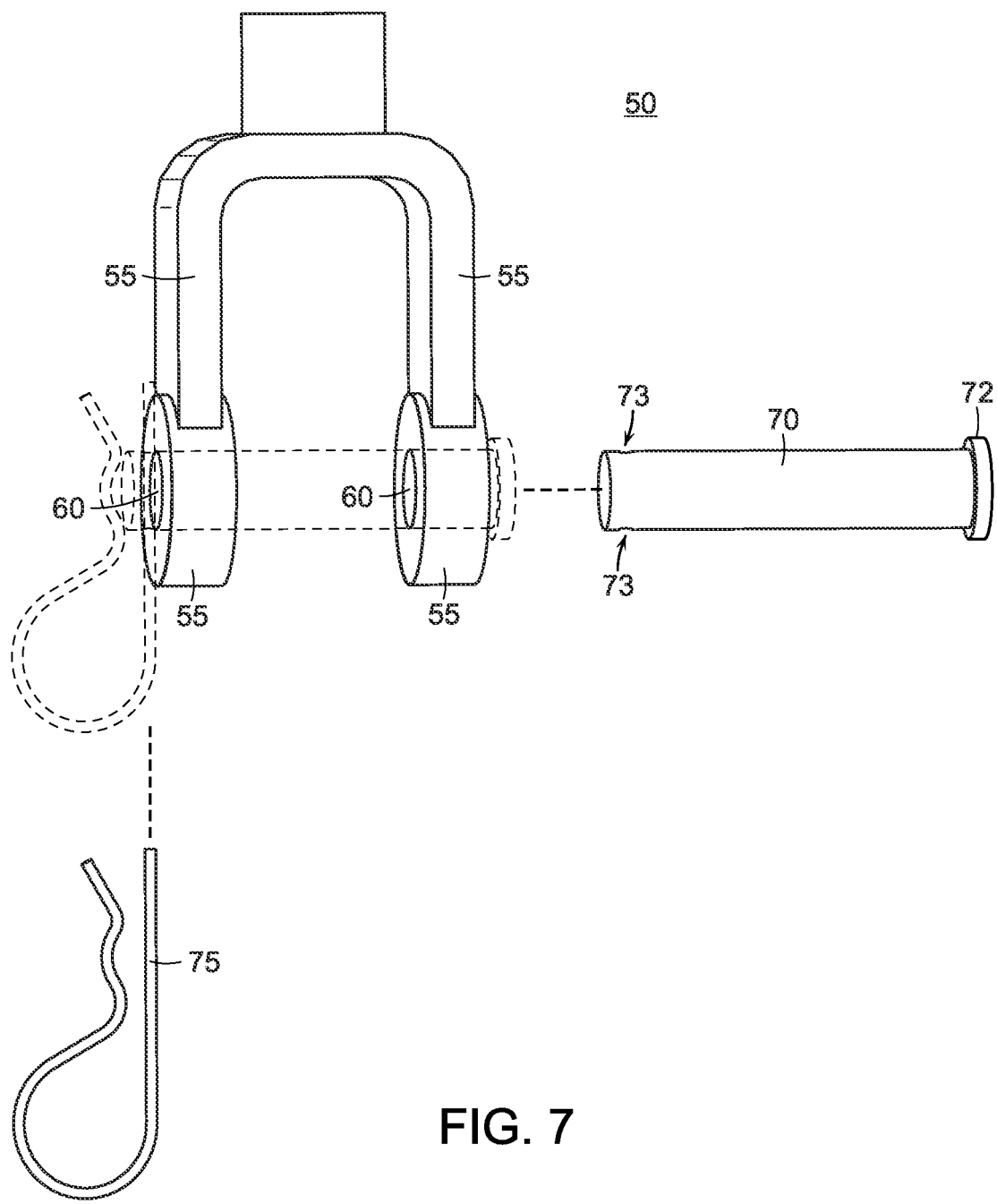
FIG. 7 is a top view of a clevis when the components are separated.

FIG. 7 is a top view of a clevis when the components are separated. Shown in FIG. 7 are the clevis 50 having a connecting end 54, branching prongs 55, a closing rod 70, and a fastening pin 75. The branching prongs 55 form a "U" shape. At the top of the prong that are through hole 60 into which the closing rod 70 may be inserted. The closing rod 70 has an enlarged head 72 at one end a pin hole 73 at the other end. The fastening pin 75 is curved metal pin having a straight section and a curved section aligned with one another. To fasten the closing rod 70 to the branching prongs 55, the closing rod 70 is inserted into the through holes 60 until the enlarged head 72 is blocked by one of the branching prongs 55. The fastening pin 75 is then used by inserting the straight section of the fastening pin 75 into the pin hole 73. As shown in FIG. 4, the curved section of the fastening pin 75 presses against the close rod 70, affixing the closing rod 70 to the branching prongs 55. To open the clevis, the user just needs to pull the fastening pin 75 out of the pin hole 73, releasing the closing rod 70 from the through holes 60.

As indicated above, the wire pulling device is preferably made from strong and durable materials such as but not limited to iron, steel, aluminum alloy, and hard plastic such as PVC, or any combination thereof. The various components may be made from the same or different materials.

The size of the wire pulling device may vary according to specific needs. In general, the length and width of the base member 10 may range from 2 to 50 cm, with the preferred scope of 4-20 cm. The length of the posts may be from 1 to 30 cm, with the referred scope of 2 to 20 cm. The length of the clevis, measured from the connecting end to the midpoint of the closing rod, may be from 2 to 50 cm, with the preferred range of 3-20 cm. The distance between the branching prongs may be 1 to 20 cm, with the preferred range of 2 to 10 cm. It is also preferred that the wire pulling device being not too heavy, with a weight of 10 g to 5 kg, and a preferred weight range from 100 g to 1 kg.

Although this invention has been described with a certain degree of particularity, it is to be understood that the present disclosure has been made only by way of illustration and that numerous changes in the details of construction and arrangement of parts may be resorted to without departing from the spirit and the scope of the invention.

What is claimed is:

1. A wire pulling device, comprising:
    a base member having a front side and an inner side;
    a vertical post attached to the front side of the base member;
    a horizontal post attached to the front side of the base member;
    wherein the vertical post and horizontal post are aligned on a same plane of the base member;
    an anchoring clevis attached to either the vertical post or the horizontal post;
    an attachment mechanism disposed on the base member, wherein
    the anchoring clevis encloses an openable wire pulling interspace capable of suspending wires and cables,
    and the attachment mechanism is capable of attaching the wire pulling device to a flat piece.

2. The wire pulling device of claim 1, wherein
    the vertical post is generally perpendicular to the base member,
    and the horizontal post is generally parallel to the base member.

3. The wire pulling device of claim 1, wherein
    the base member is a flat plank having a rectangular shape.

4. The wire pulling device of claim 3, wherein
    the base member has a post edge and an attachment edge,
    the horizontal post has a horizontal threaded section,
    the vertical post is positioned close to the post edge,
    and the horizontal post is positioned so that the threaded section points out of the post edge.

5. The wire pulling device of claim 3, wherein
    the attachment mechanism is positioned close to the attachment edge.

6. The wire pulling device of claim 1, wherein the anchoring clevis comprises:
    a connecting end supporting two branching prongs;
    a closing rod removably fastened to the branching prongs with a fastening pin, wherein
    the branching prongs and the closing rod encloses the wire pulling interspace.

7. The wire pulling device of claim 6, wherein
    the connecting end is capable of being connected to either the vertical post or the horizontal post.

8. The wire pulling device of claim 6, wherein
    removing the fastening pin allows the closing rod to be released from the branching prongs.

9. The wire pulling device of claim 6, wherein
    the vertical post has a vertical threaded section,
    the horizontal post has a horizontal threaded section, wherein
    the connected end of the anchoring clevis is capable of being threaded to either the vertical threaded section or the horizontal threaded section.

10. The wire pulling device of claim 9, further comprising a vertical post nut attached to the vertical threaded section, and a horizontal post nut attached to the horizontal threaded section, wherein
    the vertical post nut controls the positioning of the connecting end when the clevis is attached to the vertical post,
    and the horizontal post nut controls the positioning of the connecting end when the clevis is attached to the horizontal post.

11. The wire pulling device of claim 10, wherein
the fastening mechanism comprises a pair of attachment clamps positioned at the back side of the base member.

12. The wire pulling device of claim 1, wherein the vertical post and the horizontal post are welded to the base member.

13. The wire pulling device of claim 1, wherein the fastening mechanism is a series of screw holes through the base member.

14. The wire pulling device of claim 1, wherein the fastening mechanism comprises an attachment clamp positioned at the back side of the base member.

15. A wire pulling device, comprising:
a base member having a post edge, an attachment edge, a front side, and an inner side; a vertical post being attached to the front side of the base member, generally perpendicular to the base member and close to the post edge; a horizontal post being attached to the front side of the base member, generally parallel to the base member and close to the post edge; wherein the vertical post and horizontal post are aligned on a same plane of the base member;
an anchoring clevis comprising:
a connecting end supporting two branching prongs, and a closing rod removably fastened to the branching prongs with a fastening pin; a vertical post nut attached to the vertical threaded section; and a horizontal post nut attached to the horizontal threaded section; and an attachment mechanism disposed on the base member close to the attachment edge, wherein
the connecting end of the anchoring clevis is attached to either the vertical post or the horizontal post, the branching prongs and the closing rod of the anchoring clevis enclose an openable wire pulling interspace capable of suspending wires and cables,
the attachment mechanism is capable of attaching the wire pulling device to a flat piece, the horizontal post has a horizontal threaded section, the horizontal threaded section points out of the post edge, the vertical post nut controls the positioning of the connecting end when the clevis is attached to the vertical post, and the horizontal post nut controls the positioning of the connecting end when the clevis is attached to the horizontal post.

16. The wire pulling device of claim 15, wherein the fastening mechanism comprises an attachment clamp positioned at the back side of the base member.

17. The wire pulling device of claim 15, wherein the fastening mechanism comprises a pair of attachment clamps positioned at the back side of the base member.

18. The wire pulling device of claim 15, wherein the base member, the vertical post, the horizontal post, and the clevis are made from cast iron.

19. A wire pulling method, comprising removably attaching a wire pulling device having a base member to an installing site structure, with the base member being secured against the installing site structure, attaching a clevis of the wire pulling device to the base member, either directly to a vertical post on the base member, or a horizontal post on the base member, wherein the vertical post and horizontal post are aligned on a same plane of the base member; opening the clevis, positioning the wire in an interspace of the clevis, closing the clevis and allowing the wire to be suspended by the clevis, pulling the wire to an appropriate position, opening the clevis, attaching the wire using a wire tie, removing the base member from the installing site structure.

20. The wire pulling method of claim 19, further comprising:
selecting an attachment mechanism for the wire pulling device based on the structure whereto the wire pulling device is attached.

* * * * *